United States Patent
Taira et al.

(10) Patent No.: US 11,385,417 B2
(45) Date of Patent: Jul. 12, 2022

(54) CONNECTOR PLUG AND STOPPER FOR CONNECTOR PLUG

(71) Applicant: SEIKOH GIKEN Co., Ltd., Matsudo (JP)

(72) Inventors: Junji Taira, Matsudo (JP); Naotoshi Shiokawa, Matsudo (JP); Masayuki Jibiki, Matsudo (JP)

(73) Assignee: SEIKOH GIKEN Co., Ltd., Matsudo (JP)

( * ) Notice: Subject to any disclaimer, the term of this patent is extended or adjusted under 35 U.S.C. 154(b) by 0 days.

(21) Appl. No.: 17/096,955

(22) Filed: Nov. 13, 2020

(65) Prior Publication Data
US 2021/0149125 A1    May 20, 2021

Related U.S. Application Data

(60) Provisional application No. 62/935,644, filed on Nov. 15, 2019.

(51) Int. Cl.
*G02B 6/38* (2006.01)

(52) U.S. Cl.
CPC ......... *G02B 6/3893* (2013.01); *G02B 6/3825* (2013.01); *G02B 6/3831* (2013.01)

(58) Field of Classification Search
CPC ...... G02B 6/38; G02B 6/3831; G02B 6/3825; G02B 6/3885; G02B 6/3893
USPC .......................................... 385/78
See application file for complete search history.

(56) References Cited

U.S. PATENT DOCUMENTS

| 7,507,103 | B1 * | 3/2009 | Phillips | G02B 6/4201 439/352 |
| 8,287,191 | B2 | 10/2012 | Nielson et al. | |
| 9,958,623 | B1 | 5/2018 | Taira et al. | |
| 2015/0268424 | A1 * | 9/2015 | Koreeda | G02B 6/3893 385/60 |
| 2018/0356600 | A1 * | 12/2018 | Takano | G02B 6/3897 |

FOREIGN PATENT DOCUMENTS

| JP | 2004233403 A | * | 8/2004 |
| JP | 2013-29580 A | | 2/2013 |
| JP | 2019-12253 A | | 1/2019 |

OTHER PUBLICATIONS

New LC Switchable Uniboot Plus, Senko Advanced Components, Inc.

* cited by examiner

*Primary Examiner* — Kaveh C Kianni
(74) *Attorney, Agent, or Firm* — Yokoi & Co., U.S.A.; Toshiyuki Yokoi

(57) ABSTRACT

A connector plug, having: a plug body that houses an optical fiber inside; a latch that is supported on an outer surface of the plug body to be capable of being engaged with the adapter; a slider that is supported on the plug body to be slidable with respect to the plug body; and a stopper that is detachably attachable between the plug body and the slider, wherein the slider is capable of elastically deforming the latch toward the outer surface of the plug body, when the slider is slid in a detaching direction which is a direction of drawing the connector plug out of the adapter, the slider elastically deforms the latch toward the outer surface of the plug body, and when the stopper is attached between the plug body and the slider, the stopper restricts the slider from elastically deforming the latch toward the outer surface of the plug body.

13 Claims, 14 Drawing Sheets

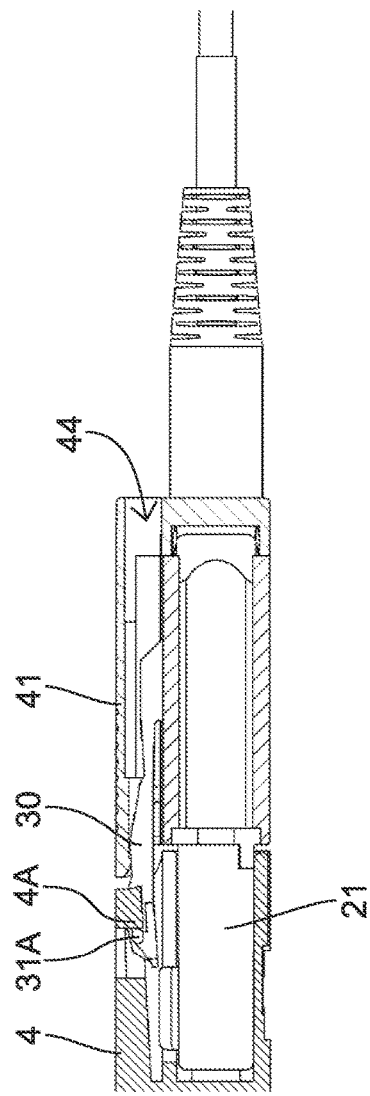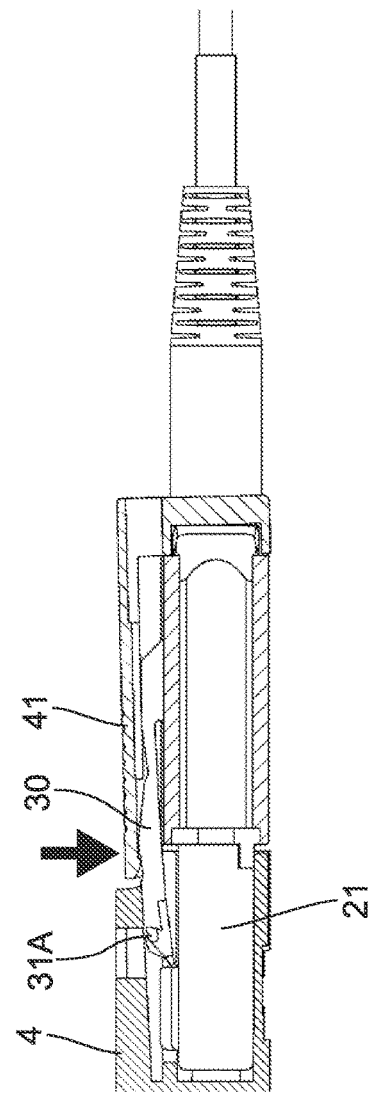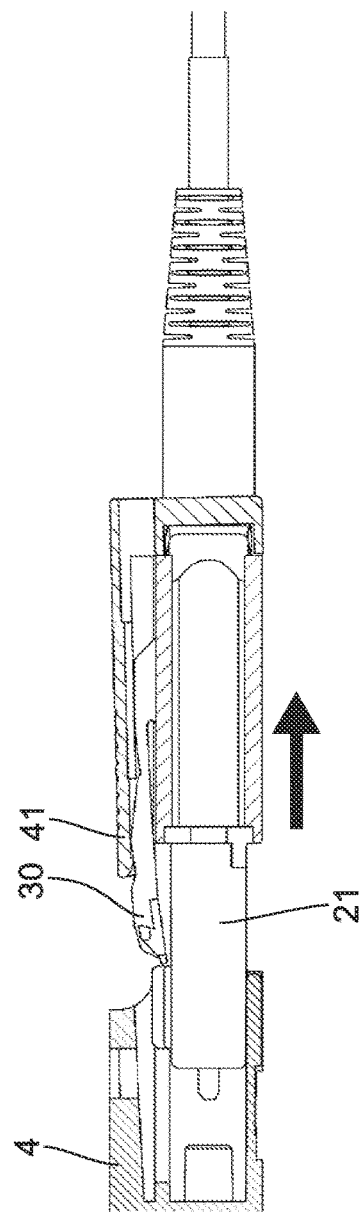

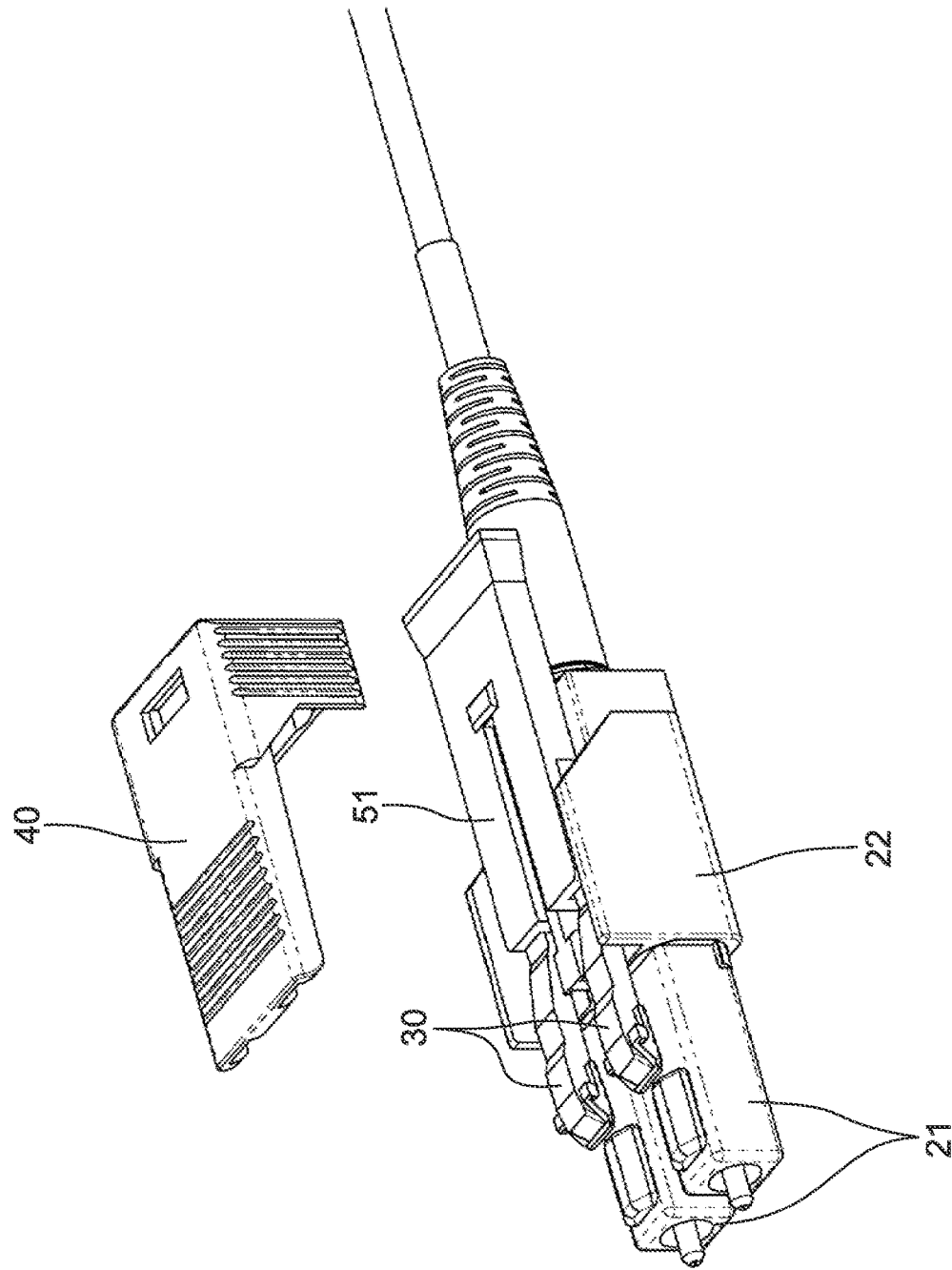

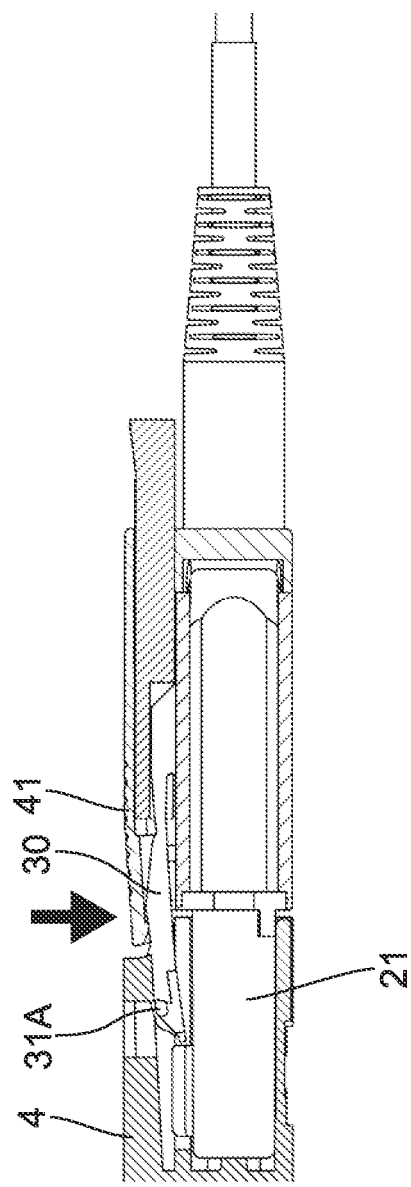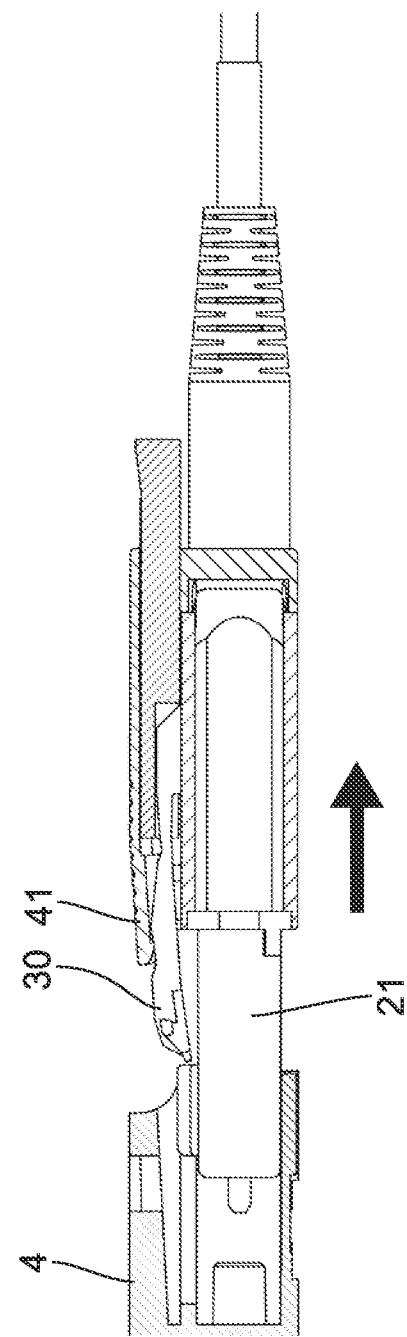

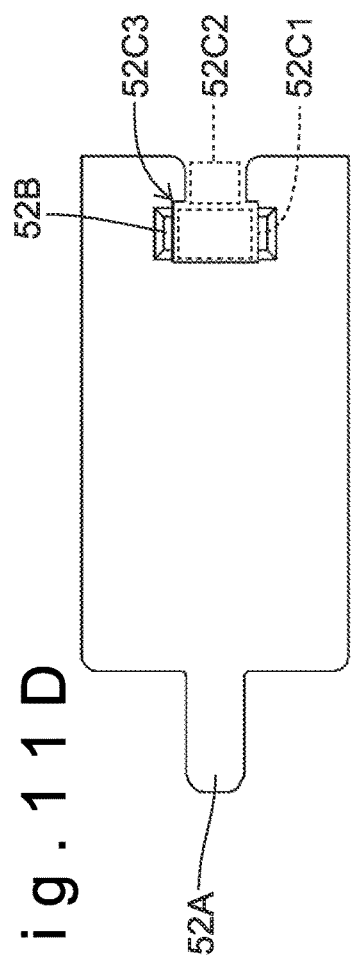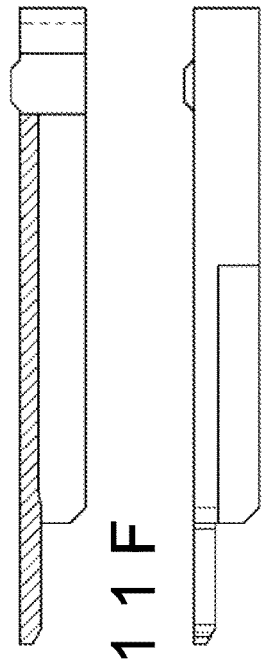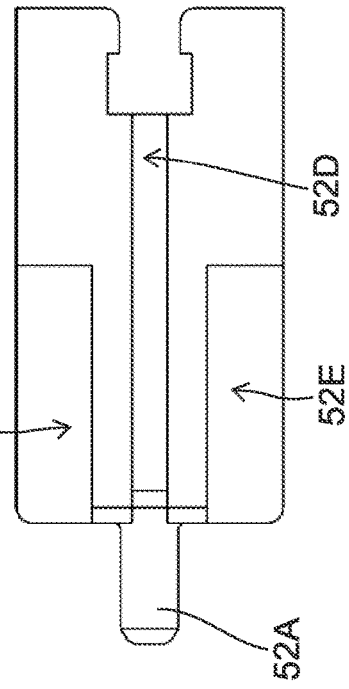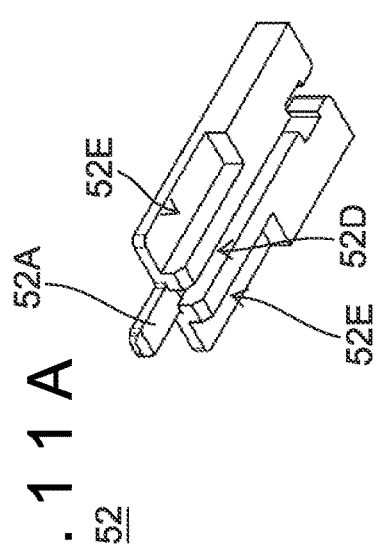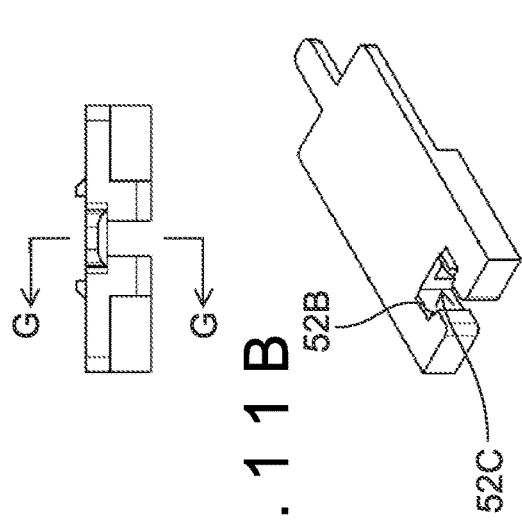

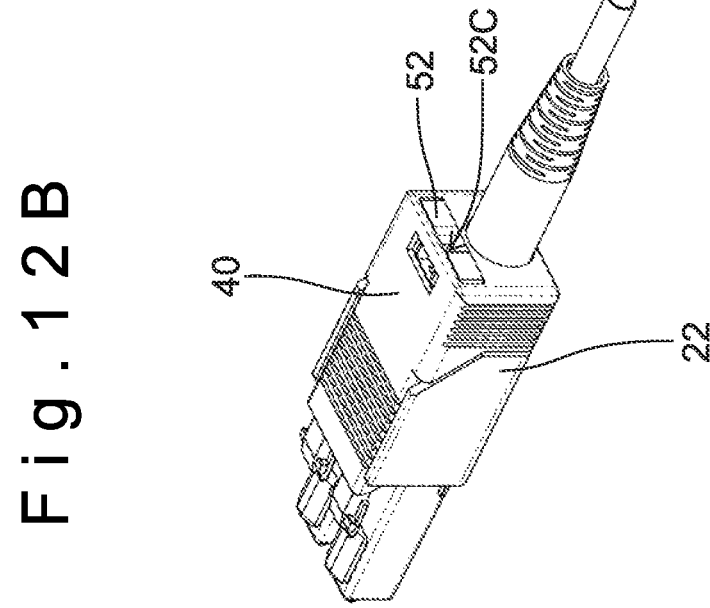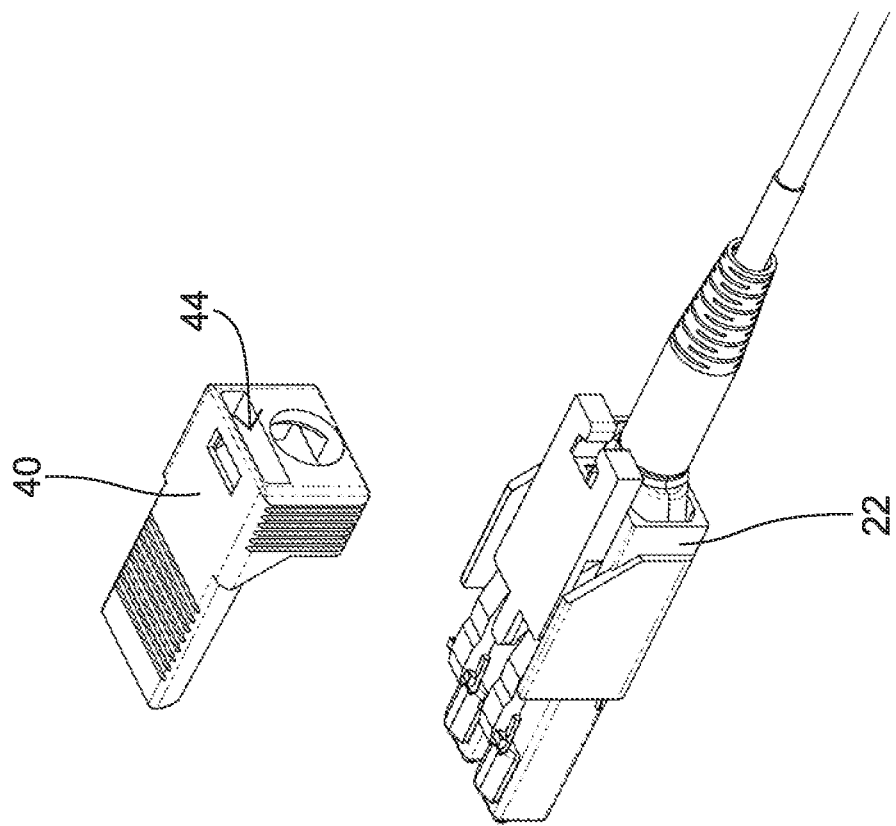

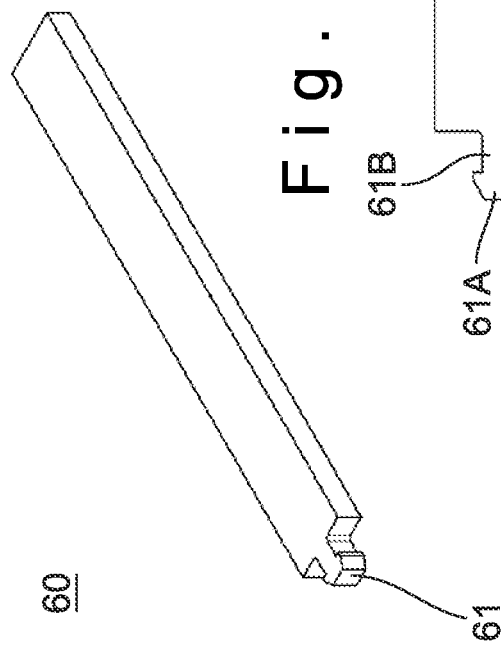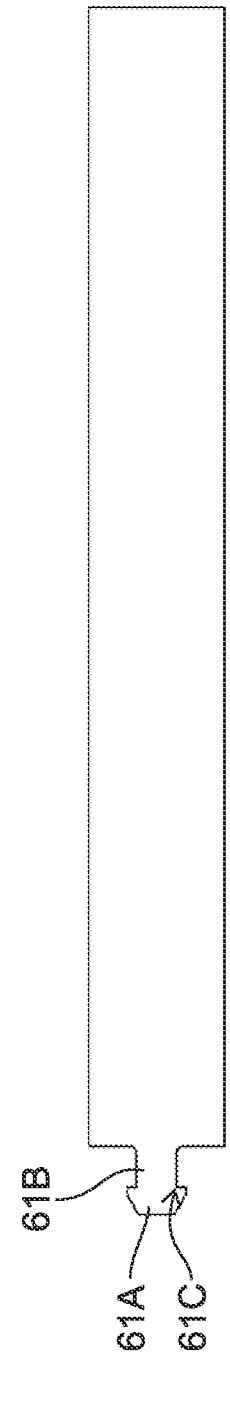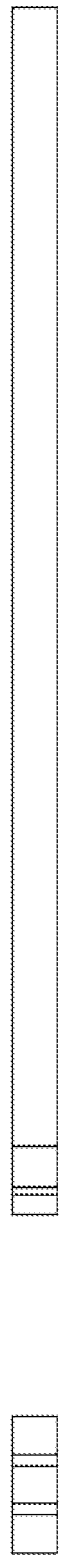

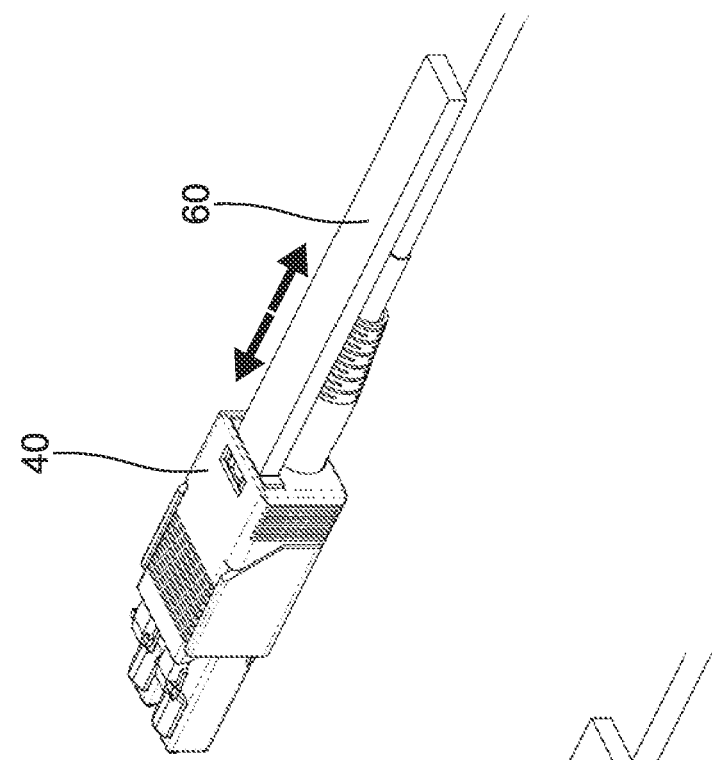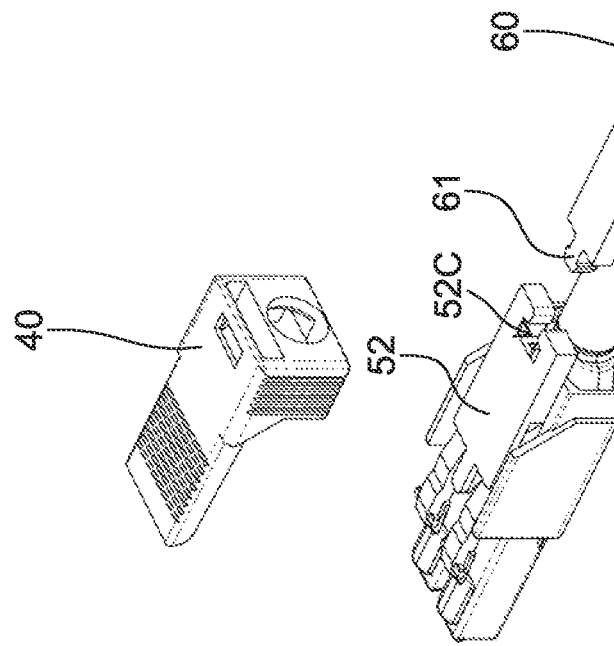

CONNECTOR PLUG AND STOPPER FOR CONNECTOR PLUG

CROSS-REFERENCES TO RELATED APPLICATIONS

This patent specification claims priority to U.S. Provisional Application Ser. No. 62/935,644, filed Nov. 15, 2019, the entire contents of which are incorporated by reference herein.

BACKGROUND OF THE INVENTION

1. Field of the Invention

The present invention relates to a connector plug and a stopper for the connector plug.

2. Description of Related Art

An optical fiber cable is connected with optical modules such as a receiver and a transmitter or another optical fiber cable via an adapter (including a so-called receptacle). Accordingly, a connector plug to be fitted to the adapter is provided on the end portion of the optical fiber cable. In the communication devices on which the optical modules are mounted and the devices such as a fiber distribution frame for relaying the optical fiber cables with each other, a plurality of adaptors may be densely provided from the viewpoint of downsizing the device, for example. For facilitating the attaching and detaching operation to the adapter, the connector plugs to which various structures are added have been developed.

In the connector plug disclosed in Patent document 1, a slider capable of sliding on an outer periphery of the connector plug is provided and a latch capable of being locked to the adapter is displaced by the slider so that the locking of the latch to the adapter can be released.

[Patent document 1] Japanese Unexamined Patent Application Publication No. 2019-012253

BRIEF SUMMARY OF THE INVENTION

When the connector plug is attached to or detached from the densely provided adaptors, an operator may erroneously touch the neighboring connector plug and the fitting of the neighboring connector plug to the adapter may be unintentionally released. In particular, in the connector plug having the slider disclosed in Patent document 1, the fitting to the adapter may be relatively easily released in some cases when the operator touches the slider. Thus, it is preferable to provide the structure for surely preventing erroneous operation of the slider.

The present invention provides a connector plug with a slider having a structure including a stopper for restricting the operation of the slider. Consequently, improvement of attachability/detachability to the adapter and prevention of erroneous operation are both achieved.

A connector plug of one embodiment of the present invention is a connector plug to be fitted to an adapter, the connector plug having: a plug body that houses an optical fiber inside the plug body; a latch that is supported on an outer surface of the plug body so as to be capable of being engaged with the adapter; a slider that is supported on the plug body so as to be slidable with respect to the plug body; and a stopper that is configured to be detachably attachable between the plug body and the slider, wherein the slider is configured to be capable of elastically deforming the latch toward the outer surface of the plug body, when the slider is slid in a detaching direction which is a direction of drawing the connector plug out of the adapter, the slider elastically deforms the latch toward the outer surface of the plug body, and when the stopper is attached between the plug body and the slider, the stopper restricts the slider from elastically deform the latch toward the outer surface of the plug body.

In the above described configuration, the latch can be configured to extend toward an opposite direction of the detaching direction from the outer surface of the plug body.

In the above described configuration, the stopper can be configured to be inserted between the plug body and the slider in an opposite direction of the detaching direction so that a distal end of the stopper is arranged between the latch and the slider.

In the above described configuration, the stopper can be configured to have a notch for avoiding a contact with the latch, and the stopper can be in contact with the plug body and the slider without being in contact with the latch when the stopper is attached between the plug body and the slider.

In the above described configuration, the connector plug can further have a jig that is configured to be detachably attachable to the stopper for drawing out the stopper in the detaching direction.

A stopper of one embodiment of the present invention is a stopper used for a connector plug, the connector plug having: a plug body that houses an optical fiber inside the plug body; a latch that is supported on an outer surface of the plug body so as to be capable of being engaged with an adapter; a slider that is supported on the plug body so as to be slidable with respect to the plug body; and a stopper that is configured to be detachably attachable between the plug body and the slider, wherein the slider is configured to be capable of elastically deforming the latch toward the outer surface of the plug body, when the slider is slid in a detaching direction which is a direction of drawing the connector plug out of the adapter, the slider elastically deforms the latch toward the outer surface of the plug body, and when the stopper is attached between the plug body and the slider, the stopper restricts the slider from elastically deforming the latch toward the outer surface of the plug body.

The present invention can provide a connector plug with a slider having a structure capable of attaching and detaching the stopper and restricting the operation of the slider only when the stopper is attached. Consequently, the fitting of the connector plug to the adapter is prevented from being released by the erroneous operation without spoiling the attachability/detachability to the adapter.

BRIEF DESCRIPTION OF THE DRAWINGS

FIGS. 4A to 4C are cross-sectional views showing the structure of attaching and detaching the connector plug 10 to and from an adapter 4.

FIG. 8 is a perspective view showing a state that the stopper 51 is attached to the connector plug 10.

FIGS. 10A and 10B are perspective views showing a state that the stopper 51 is attached to the connector plug 10.

FIGS. 11A to 11G are drawings showing the structure of a stopper 52.

FIGS. 12A and 12B are perspective views showing a state that the stopper 52 is attached to the connector plug 10.

FIGS. 13A to 13D are drawings showing the structure of a jig 60.

FIGS. 14A and 14B are perspective views showing the structure of attaching and detaching the jig 60 to and from the stopper 52.

DETAILED DESCRIPTION OF THE INVENTION

Hereafter, embodiments of the present invention will be explained with reference to the drawings shown as an example.

Figure 1:
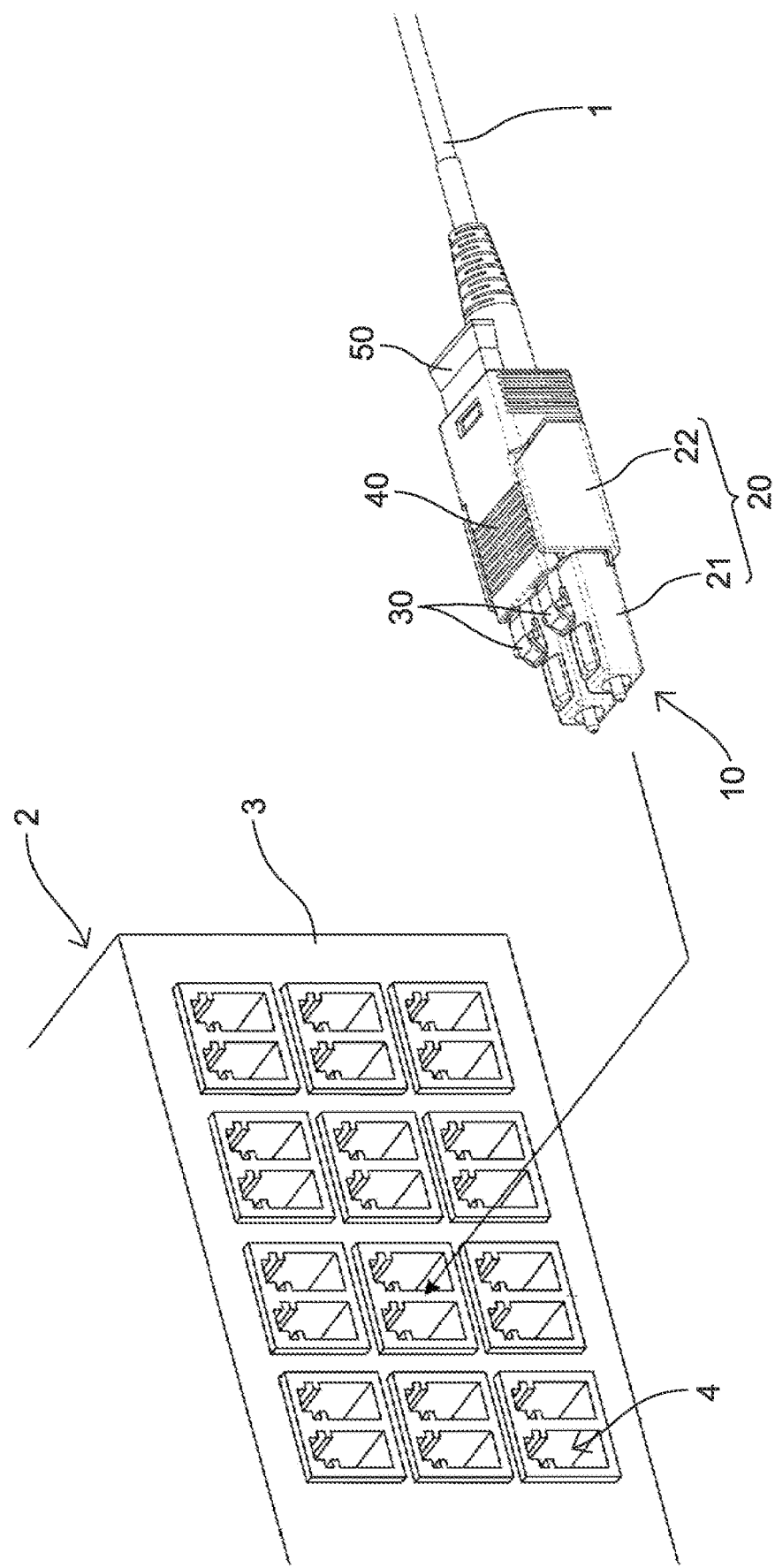
FIG. 1 is a perspective view for explaining an outline of a connector plug 10.

FIG. 1 is a perspective view for explaining an outline of a connector plug 10. As shown in FIG. 1, the connector plug 10 is attached to the end portion of an optical fiber cable 1. The connector plug 10 attached to the optical fiber cable 1 is fitted to an adapter 4 (into a fitting hole) provided on a panel 3 of a device 2. Consequently, the optical fiber cable 1 is connected with the optical module or another optical fiber cable via the connector plug 10 and the adapter 4. In the following explanation, the direction of detaching (removing) the connector plug 10 from the adapter 4 is referred to as a detaching direction (removing direction), and the direction of inserting (attaching) the connector plug 10 to the adapter 4 is referred to as an inserting direction (attaching direction), where the inserting direction is an opposite direction of the detaching direction.

The connector plug 10 is comprised of a plug body 20, latches 30, a slider 40 and a stopper 50. The plug body 20 houses the optical fiber cable 1 inside the plug body 20. The plug body 20 is a portion to be inserted into the adapter 4. The latches 30 extend toward the inserting direction from the outer surface of the plug body 20. The latches 30 have a structure capable of being engaged with the adapter 4. The slider 40 is supported on the plug body 20. The slider 40 has a structure slidable with respect to the plug body 20. The stopper 50 is configured to be detachably attachable (i.e., set, placed) between the plug body 20 and the slider 40 from the detaching direction.

Figure 2:
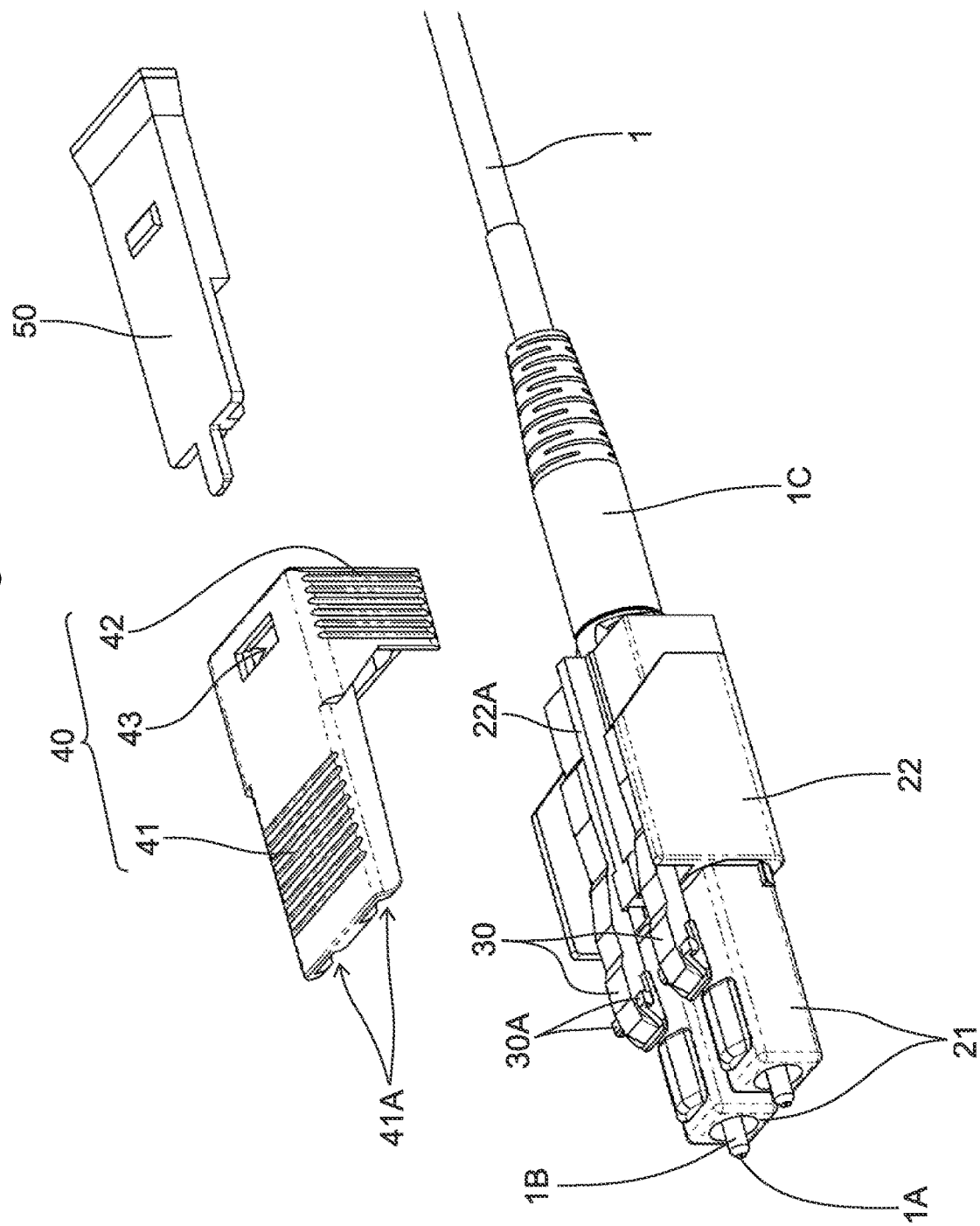
FIG. 2 is a perspective view of the connector plug 10 in a state that a slider 40 and a stopper 50 are separated.
Figure 3:
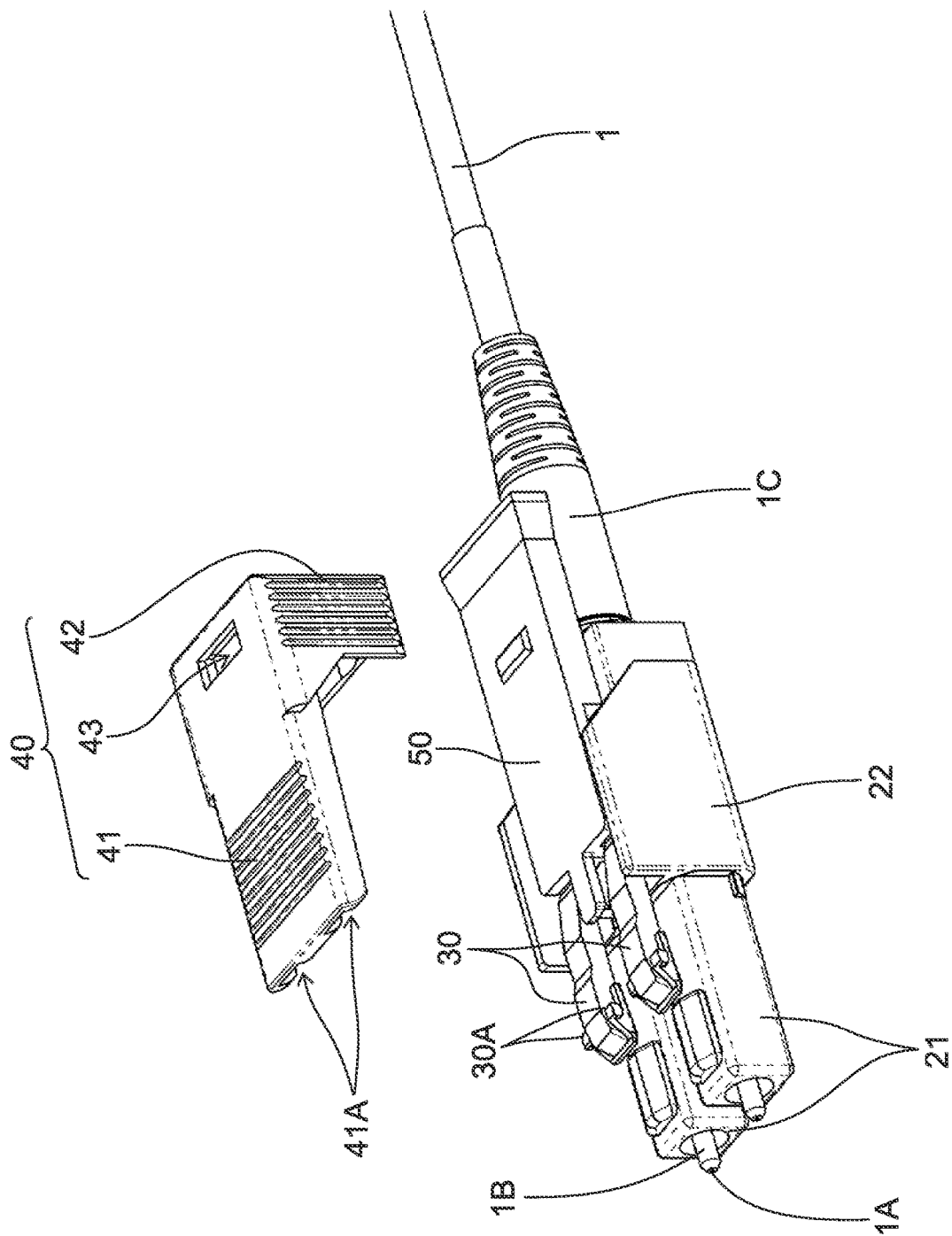
FIG. 3 is a perspective view showing a state that the stopper 50 is attached to a plug body 20.

FIG. 2 is a perspective view of the connector plug 10 in a state that the slider 40 and the stopper 50 are separated from the plug body 20. FIG. 3 is a perspective view showing a state that the stopper 50 is attached to the plug body 20. Although the slider 40 is normally used in a state of being attached to the plug body 20 as shown in FIG. 1, the slider 40 is shown in a separated state in FIG. 2 and FIG. 3 for showing the internal structure of the connector plug 10. As shown in FIG. 2 and FIG. 3, the plug body 20 is comprised of two cylindrical shaped plug frames 21 and a latch frame 22 for supporting the plug frames 21. A ferrule 1B for holding an optical fiber 1A provided inside the optical fiber cable 1 is inserted into the plug frames 21 and the latch frame 22 and projected from the end portion of the plug frames 21 in the inserting direction. The optical fiber cable 1 drawn out of the end portion of the latch frame 22 in the detaching direction is inserted into a boot 1C for preventing damage of the optical fiber cable 1 caused by the bending of the cable. Thus, the boot 1C covers a periphery of the optical fiber cable 1. Although the explanation is made by using a double-core cable having two optical fibers 1A in the present embodiment, the optical fiber cable 1 is not limited to the double-core cable. The present invention can be similarly applied to a single-core cable having one optical fiber or a multi-core cable having three or more optical fibers by changing the number of the plug frames 21.

The plug frames 21 are provided on each of the ferrules 1B. Each of the plug frames 21 is formed in a cylindrical shape to cover the ferrule 1B from an outer side. An inner wall of each of the plug frames 21 has a circular cavity when viewed from the inserting direction. The ferrule 1B holding the optical fiber 1A is arranged at the center of the circular cavity. An outer wall of each of the plug frames 21 is formed in a rectangular shape matched with the shape of the inner wall of the adapter 4 when viewed from the inserting direction.

The latch frame 22 is formed in a cylindrical shape having an approximately rectangular shape to cover the two plug frames 21 from the outer side. Two latches 30 extending toward the inserting direction (opposite direction of the detaching direction) are provided on an upper surface (outer surface) of the latch frame 22. The two latches 30 are supported on the outer surface of the latch frame 22, and the distal ends of the two latches 30 are arranged above the two plug frames 21 respectively. A clearance is formed between the latches 30 and the plug frames 21. When the latches 30 are elastically deformed and moved upward and downward, the distance between the latches 30 and the plug frames 21 is changed. A locking portion 30A having locking protrusions which are protruded toward both sides in the width direction is formed on each of the latches 30. The width direction means the direction orthogonal to the inserting direction and the detaching direction. When the locking portions 30A are locked (latched) to the adapter 4, the connector plug 10 is fitted to the adapter 4. By applying a downward force to the latches 30 to move the latches 30 so that the latches 30 approach the outer surface of the plug frames 21, the distance between the plug frames 21 and the latches 30 is changed and the locking portions 30A can be moved in the vertical direction (upward and downward). When the locking portions 30A are moved downward, the contact between a locking piece 4A (shown in FIG. 4A) provided on the adapter 4 and the locking portions 30A is avoided and the connector plug 10 can be inserted into and removed from the adapter 4. By releasing the elastic deformation of the latches 30 in a state that the connector plug 10 is inserted into the adapter 4, the locking portions 30A are locked by the locking piece 4A and the connector plug 10 can be fixed to the adapter 4 in a state that the connector plug 10 is inserted into the adapter 4. In the present embodiment, the explanation is made regarding the surface on which the latches 30 are formed as the upper surface in the outer surface of the latch frame 22. Needless to say, when the direction of the adapter 4 is different, the connector plug 10 is attached to the adapter 4 in a state that the surface on which the latches 30 are formed is directed to the other surfaces.

The slider 40 is comprised of a cover portion 41 arranged on an upper surface of the latch frame 22 and a gripping portion 42 arranged on the detaching direction side (rear side) of the latch frame 22. The outer surface (upper surface) of the latch frame 22 and the inner surface (lower surface) of the cover portion 41 of the slider 40 are faced with each other interposing the latches 30 between them. When the cover portion 41 is displaced downward toward the outer surface of the latch frame 22, the cover portion 41 presses the latches 30 to elastically deform the latches 30 toward the outer surface of the latch frame 22. Consequently, the engagement of the latches 30 to the adapter 4 can be released.

Two sliding grooves 41A for housing the two latches 30 are formed on the inner surface (lower surface) of the cover portion 41. The sliding grooves 41A extend in the sliding direction of the slider 40 (i.e., inserting direction/detaching direction of the connector plug 10). Since the latches 30 are housed in the sliding grooves 41A, the slider 40 can be moved in the inserting direction and the detaching direction with respect to the outer surface of the plug body 20. When the force is applied to the slider 40 in the detaching direction, the slider 40 is slid in the detaching direction with respect to the plug body 20 and the slider 40 elastically deforms the latches 30 toward the outer surface of the plug frames 21. Consequently, the engagement of the latches 30 to the adapter 4 can be released. When the force applied to the slider 40 in the detaching direction is released, the elastic deformation of the latches 30 is released and the slider 40 is slid toward the inserting direction. The structure where the slider 40 elastically deforms the latches 30 will be explained later in detail. Note that the configuration of the slider 40 is not limited to the above described configuration as long as the slider 40 has the configuration capable of moving with respect to the outer surface of the plug body 20. For example, it is possible to form the sliding grooves on the upper surface of the latch frame 22 so that the slider 40 slides on the sliding grooves.

The gripping portion 42 is a portion gripped by the operator when the operator slides the slider 40. The gripping portion 42 is formed integrally with the cover portion 41, and the gripping portion 42 covers the end portion of the plug body 20 in the detaching direction from the rear surface and lateral surfaces. A circular insertion hole for inserting the boot 1C is formed on the rear surface of the gripping portion 42. In addition, a rectangular insertion hole 44 (shown in FIG. 4A) for inserting the stopper 50 is formed above the circular insertion hole. The gripping portion 42 is linked with the cover portion 41 and slid on the outer periphery of the plug body 20 in the inserting direction and the detaching direction.

The stopper 50 is configured to be attachable between the plug body 20 and the slider 40 by being inserted from the rectangular insertion hole 44 formed on the rear surface of the slider 40 toward the inserting direction along the upper surface of the latch frame 22. When the stopper 50 is attached between the plug body 20 and the slider 40, the stopper 50 restricts the cover portion 41 from elastically deforming the latches 30 toward the outer surface of the latch frame 22. The structure of the stopper 50 will be explained in detail later.

Hereafter, the structure of attaching and detaching the connector plug 10 to and from the adapter 4 will be explained. FIG. 4A is a cross-sectional view showing a state that the connector plug 10 is attached to the adapter 4. FIG. 4B is a cross-sectional view showing a state that the engagement between the latches 30 and the adapter 4 is released by pressing the cover portion 41 downward. FIG. 4C is a cross-sectional view showing a state that the connector plug 10 is detached from the adapter 4.

As shown in FIG. 4A, the connector plug 10 is fitted with the adapter 4 by inserting the connector plug 10 toward the adapter 4 and locking the locking portions 30A of the latches 30 to the locking piece 4A of the adapter 4. When detaching the connector plug 10 from the adapter 4, as shown in the arrow mark of FIG. 4B, the cover portion 41 of the slider 40 is pressed downward toward the outer surface of the plug frames 21. Consequently, the cover portion 41 presses the latches 30, and the latches 30 are elastically deformed toward the outer surface of the plug frames 21. Thus, the locking between the locking portions 30A and the locking piece 4A is released. In this state, when the connector plug 10 is drawn out (pulled) toward the detaching direction as shown in the arrow mark of FIG. 4C, the connector plug 10 is detached from the adapter 4.

In addition, when the slider 40 is pulled toward the detaching direction while gripping the gripping portion 42 of the slider 40 in the state shown in FIG. 4A, the slider 40 is slid in the detaching direction with respect to the plug body 20 and the latches 30 are pushed downward and elastically deformed toward (to approach) the outer surface of the plug frames 21. As explained above, when the slider 40 is slid in the detaching direction, the force similar to the force of pressing the cover portion 41 downward toward the outer surface of the plug frames 21 can be applied to the latches 30.

Figure 5A:
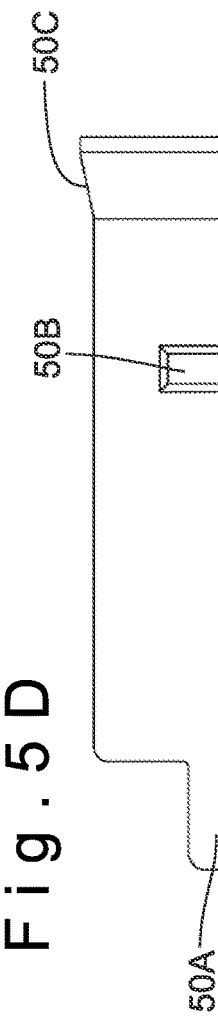
FIGS. 5A to 5G are drawings showing the structure of the stopper 50.
Figure 5B:
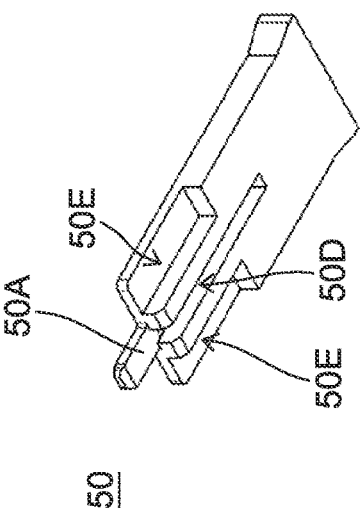
Figure 5C:
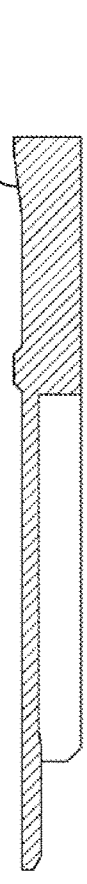
Figure 5D:
Figure 5E:
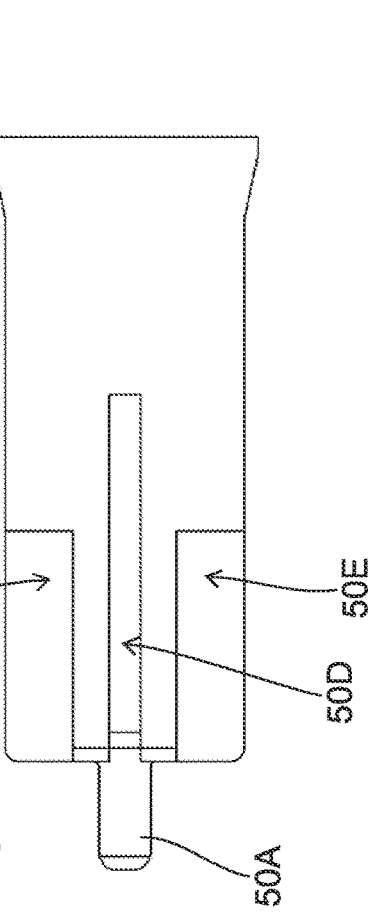
Figure 5F:
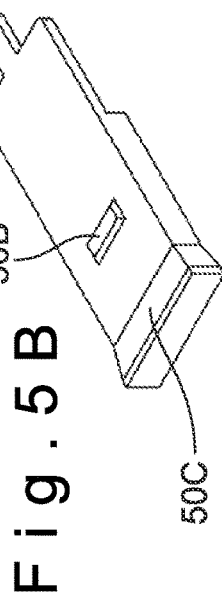
Figure 5G:
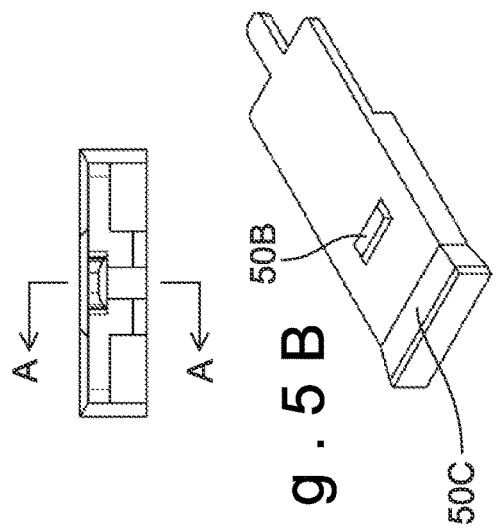

Hereafter, the structure of the stopper 50 will be explained. FIGS. 5A and 5B are perspective views, 5C is a front view, FIG. 5D is a plan view, FIG. 5E is a bottom view, FIG. 5F is a side view of the stopper 50, and FIG. 5G is a cross-sectional view cut along a line A-A of FIG. 5C. The stopper 50 is formed in a plate shape having an approximately rectangular shape in a plan view. The stopper 50 has a projected piece 50A on the end potion of the inserting direction at a center in the width direction. The projected piece 50A has a narrow width compared to the other portions of the stopper 50. The projected piece 50A has a shape of projecting forward from the end portion in the inserting direction of the stopper 50. As shown in FIG. 3, when the stopper 50 is attached between the plug body 20 and the slider 40, the projected piece 50A is arranged between the two latches 30 and in contact with the upper surface of the plug body 20.

A raised portion 50B protruding upward is formed on the upper surface of the stopper 50. Although the raised portion 50B is formed in a rectangular shape in a plan view, the raised portion 50B has a trapezoidal shape in a cross-section when viewed from a side, a front or a rear since an inclined surface is formed on the end portions of the forward and backward directions and the left and right directions. When the stopper 50 is attached between the plug body 20 and the slider 40, the raised portion 50B is locked to a locking hole 43 provided on the upper surface of the slider 40. Consequently, the raised portion 50B positions between the slider 40 and the stopper 50 and prevents the stopper 50 from unintentionally removing from the slider 40.

A gripping portion 50C is formed on the end portion in the detaching direction of the stopper 50. The gripping portion 50C is a portion gripped by the operator when attaching and detaching the stopper 50. As shown in FIG. 5F and FIG. 5G, the gripping portion 50C has a portion where the thickness is gradually increased toward the detaching direction. In addition, as shown in FIG. 5D and FIG. 5E, the gripping portion 50C has a portion where the width is gradually increased toward the detaching direction. Since the gripping portion 50C has the above described shape, the operator can easily grasp the stopper 50.

As shown in FIG. 5A and FIG. 5E, a notch (groove) 50D is formed on the lower surface of the stopper 50 at the center in the width direction of the end portion in the inserting direction. The notch 50D is a portion where the thickness of the stopper 50 is thinner than the other portions. It can be also said that the notch 50D is a recessed portion recessed upward from the lower surface of the stopper 50 by a predetermined height. Consequently, the notch 50D has a space (clearance) having a rectangular cross-section in a front view at the lower surface of the stopper 50. The notch 50D is formed for avoiding a raised portion 22A located at the center part in the width direction of the latch frame 22 shown in FIG. 2. In addition, notches (grooves) 50E are formed on the lower surface of the stopper 50 at both left and right ends of the end portion in the inserting direction of the stopper 50. Similar to the notch 50D, the notches 50E are recessed portions recessed upward from the lower surface of the stopper 50 by a predetermined height and the notches 50E form a space (clearance) having a rectangular cross-section in a front view. The notches 50E are formed for avoiding a contact with the latches 30.

The stopper 50 has a uniform thickness except for the portions where the projected piece 50A, the raised portion 50B, the gripping portion 50C and the notches 50D, 50E are formed. The stopper 50 is configured to be in contact with the upper surface of the plug body 20 and the lower surface of the slider 40 at the above described portion having the uniform thickness. Namely, it can be said that the stopper 50 has a uniform thickness at the entire area where the stopper 50 is in contact with the plug body 20 and the slider 40.

Figure 6A:
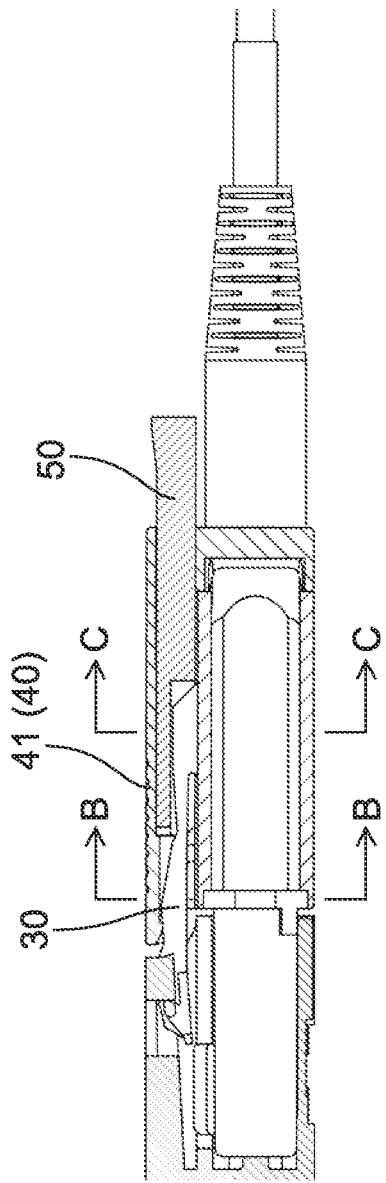
FIGS. 6A to 6C are cross-sectional views showing a state that the stopper 50 is attached to the connector plug 10.
Figure 6B:
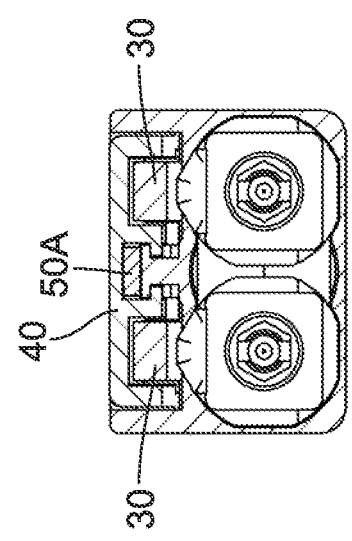
Figure 6C:
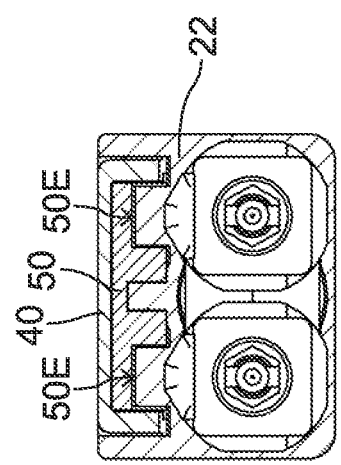

FIG. 6A is a cross-sectional view showing a state that the stopper 50 is attached between the plug body 20 and the slider 40. FIG. 6B is a cross-sectional view cut along a line B-B of FIG. 6A. FIG. 6C is a cross-sectional view cut along a line C-C of FIG. 6A. As shown in FIG. 6A, when the stopper 50 is attached between the plug body 20 and the slider 40, the distal end of the stopper 50 is arranged between the latches 30 and the slider 40. As shown in FIG. 6B, the projected piece 50A of the stopper 50 is positioned between the two latches 30 and in contact with the raised portion 22A located at the center part in the width direction of the latch frame 22. As shown in FIG. 6C, the stopper 50 is in contact with the upper surface of the plug body 20 (latch frame 22) and the lower surface of the slider 40. In addition, since the notches 50E are formed at the left and right ends of the stopper 50, the stopper 50 is configured not to be in contact with the latches 30. Consequently, even when the force of pressing the cover portion 41 of the slider 40 from above is applied, the force is transmitted from the lower surface of the slider 40 to the stopper 50, and further the force is transmitted from the stopper 50 to the raised portion 22A located at the center part in the width direction of the latch frame 22. Since the latches 30 are not in contact with the stopper 50, the force applied from above is not transferred to the latches 30. Accordingly, even when the force is applied to the slider 40, the engagement between the latches 30 and the adapter 4 is prevented from being released.

Figure 7A:
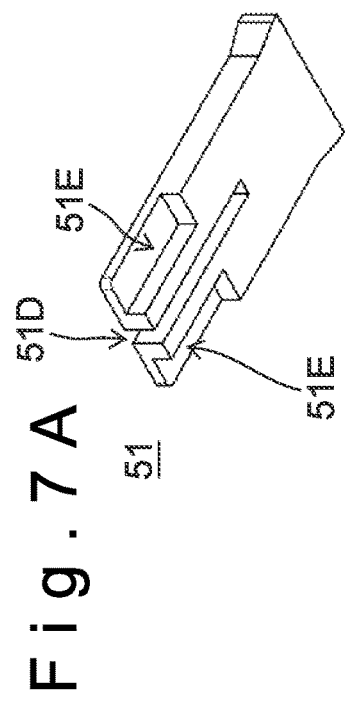
FIGS. 7A to 7G are drawings showing the structure of a stopper 51.
Figure 7C:
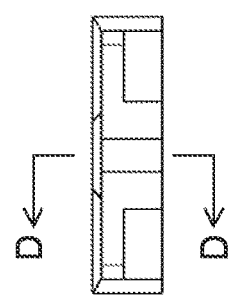
Figure 7B:
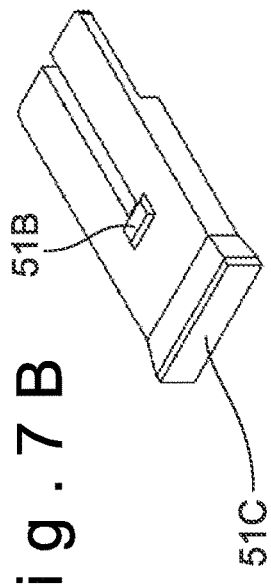
Figure 7D:
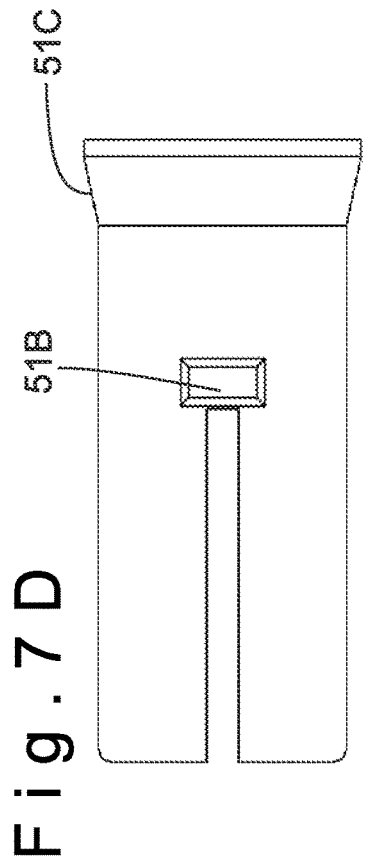
Figure 7G:
Figure 7F:
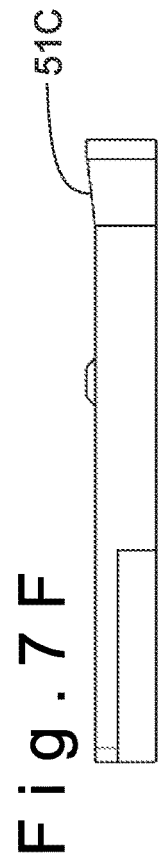
Figure 7E:
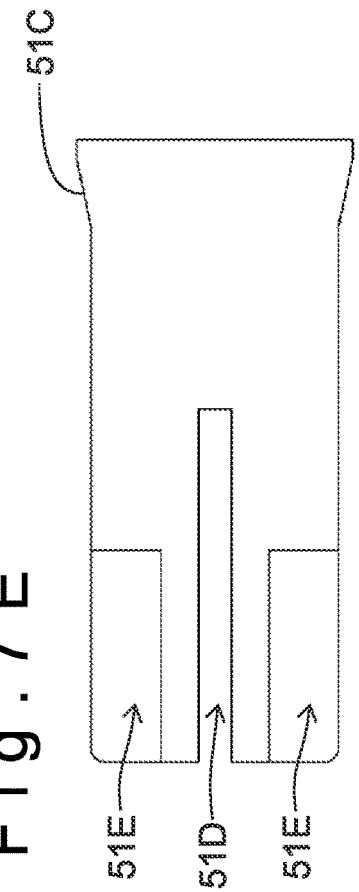

FIGS. 7A to 7G show a stopper 51 as another example of the stopper. FIGS. 7A and 7B are perspective views, 7C is a front view, FIG. 7D is a plan view, FIG. 7E is a bottom view, FIG. 7F is a side view of the stopper 51, and FIG. 7G is a cross-sectional view cut along a line D-D of FIG. 7C. In addition, FIG. 8 is a perspective view showing a state that the stopper 51 is attached to the connector plug 10. Although the slider 40 is shown as the separated state in FIG. 8, same as FIG. 3 or the like, the slider 40 is normally used in a state of being attached to the plug body 20. Different from the stopper 50, the projected piece is not formed on the stopper 51 at the end portion in the inserting direction. In addition, a notch (groove) 51D penetrates through the thickness direction of the stopper 51. In the following explanation, the explanation of the structure of the stopper 51 will be omitted for the structure in common with the stopper 50.

The stopper 51 is formed in a plate shape having an approximately rectangular shape in a plan view. The stopper 51A has a notch 51D on the end portion in the inserting direction so as to penetrate through the stopper 51 in the thickness direction at the center in the width direction. It can be said that the notch 51D is a slit for dividing the end portion in the inserting direction of the stopper 51 into two in the width direction. As shown in FIG. 8, when the stopper 51 is attached between the plug body 20 and the slider 40, each of the divided distal ends of the stopper 51 is located above each of the two latches 30. A raised portion 51B protruded upward is formed on the upper surface of the stopper 51. The structure of the raised portion 51B is same as that of the raised portion 50B. A gripping portion 51C is formed on the end portion in the detaching direction of the stopper 51. The structure of the gripping portion 51C is same of that of the gripping portion 50C. Notches (grooves) 51E are formed on the both ends in the width direction of the end portion in the inserting direction of the stopper 51. The structure of the notches 51E is same as that of the notches 50E.

Figure 9A:
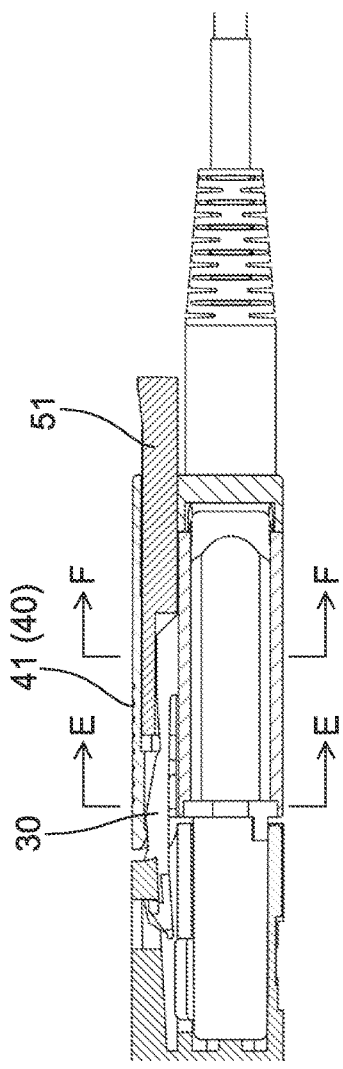
FIGS. 9A to 9C are cross-sectional views showing a state that the stopper 51 is attached to the connector plug 10.
Figure 9B:
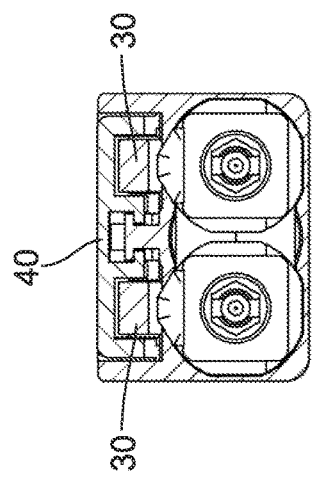
Figure 9C:
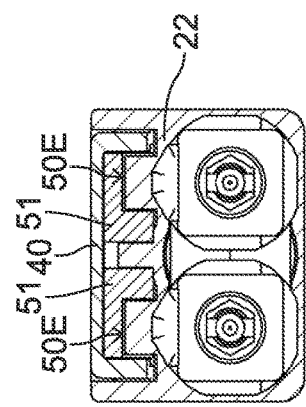

FIG. 9A is a cross-sectional view showing a state that the stopper 51 is attached between the plug body 20 and the slider 40. FIG. 9B is a cross-sectional view cut along a line E-E of FIG. 9A. FIG. 9C is a cross-sectional view cut along a line F-F of FIG. 9A. As shown in FIG. 9A, when the stopper 51 is inserted between the plug body 20 and the slider 40 from the detaching direction side to the inserting direction side, the distal end of the stopper 51 is arranged between the latches 30 and the slider 40. Different from the stopper 50, the distal end of the stopper 51 does not reach the front end surface in the inserting direction of the latch frame 22. As shown in FIG. 9C, the stopper 51 is in contact with the upper surface of the plug body 20 and the lower surface of the slider 40. In addition, since the notches 51E is formed, the stopper 51 is configured not to be in contact with the latches 30.

FIG. 10A is a perspective view showing a state that the cover portion 41 of the slider 40 is pressed downward while the stopper 51 is attached. Different from the stopper 50, the stopper 51 has the notch 51D penetrating through the stopper 51 in the thickness direction and the stopper 51 has a structure divided into two in the width direction at the end portion in the inserting direction. Accordingly, although the stopper 51 is not elastically deformed by the force less than a predetermined value, the stopper 51 is elastically deformed when the force of the predetermined value or more is applied. As shown in FIG. 10A, when the force of the predetermined value or more is applied to the cover portion 41 of the slider 40, the cover portion 41 is elastically deformed and the cover portion 41 elastically deforms the latches 30 downward. In this state, as shown in FIG. 10B, when the connector plug 10 is drawn out (pulled) toward the detaching direction, the connector plug 10 can be detached from the adapter 4. In the stopper 51, although the latches 30 is not elastically deformed toward the outer surface of the latch frame 22 when a small force less than the predetermined value is applied to the cover portion 41, the latches 30 can be elastically deformed toward the outer surface of the latch frame 22 when a large force having the predetermined value or more is applied to the cover portion 41. The stopper 51 increases the force required for elastically deforming the latches 30 toward the outer surface of the latch frame 22 compared to the normal state (state without having the stopper).

FIGS. 11A to 11G show a stopper 52 as another example of the stopper. FIGS. 11A and 11B are perspective views, 11C is a front view, FIG. 11D is a plan view, FIG. 11E is a bottom view, FIG. 11F is a side view of the stopper 52, and FIG. 11G is a cross-sectional view cut along a line G-G of FIG. 11C. FIG. 12A is a drawing showing a state that the stopper 52 is attached to the connector plug 10 while the slider 40 is separated from the connector plug 10. FIG. 12B is a drawing showing a state that the stopper 52 is attached to the connector plug 10 while the slider 40 is attached to the connector plug 10. Different from the stopper 50 and the stopper 51, the stopper 52 is provided with a jig attachment groove 52C to which a jig for drawing out the stopper 52 in the detaching direction is detachably attachable. In the following explanation, the explanation of the structure of the stopper 52 will be omitted for the structure in common with the stopper 50.

Compared to the stopper 50, the stopper 52 has a structure where the portion corresponding to the gripping portion is omitted. As shown in FIG. 11B, the stopper 52 has the jig attachment groove 52C penetrating through the thickness direction at the center on the end portion in the detaching direction. Namely, the stopper 52 has a structure divided into two in the width direction at the end portion in the detaching direction. Although a raised portion 52B protruded upward is formed on the upper surface of the stopper 52, the jig attachment groove 52C penetrates through the center in the width direction of the raised portion 52B and the raised portion 52B is divided into two (left and right). A projected piece 52A is formed on the end portion in the inserting direction of the stopper 52 at the center in the width direction. The structure of the projected piece 52A is same as that of the projected piece 50A. Notches (grooves) 52E are formed on the both ends in the width direction of the end portion in the inserting direction of the stopper 52. The structure of the notches 52E is same as that of the notches 50E.

As shown in broken lines of FIG. 11D, it can be said that the jig attachment groove 52C is comprised of a locking hole 52C1 having an approximately rectangular shape in a plan view and a communication hole 52C2 which communicates with the locking hole 52C1 and is opened to the detaching direction side. The width of the communication hole 52C2 is specified to be smaller than the width of the locking hole 52C1. Consequently, a locking portion 52C3 having an L-shape in a plan view is formed at a boundary portion between the locking hole 52C1 and the communication hole 52C2. The structure capable of pulling the stopper 52 toward the detaching direction is achieved by locking a later described jig 60 to the locking portion 52C3.

The end portion in the detaching direction of the stopper 52 is divided into two (left and right) by the jig attachment groove 52C. Consequently, when the force is applied to the communication hole 52C2 from inside to outside, the end portion in the detaching direction of the stopper 52 is slightly elastically deformed. Thus, the width of the communication hole 52C2 can be slightly broadened. An inclined surface rounded to gradually broaden the width toward the detaching direction in a plan view is formed on both (left and right) end portions in the detaching direction of the communication hole 52C2.

As shown in FIG. 12A and FIG. 12B, when the stopper 52 is attached between the plug body 20 and the slider 40, the stopper 52 is almost entirely housed inside the slider 40. Namely, the rear end position of the stopper 52 is configured to be approximately same as the rear end position of the slider 40. Consequently, the stopper 52 does not occupy an excess space even when there is not an enough space at the rear side of the connector plug 10. Furthermore, since the stopper 52 is not projected from the rear end of the slider 40, the stopper 52 is prevented from being gripped from the outside of the slider 40.

FIGS. 13A to 13D show a jig 60. FIG. 13A is a perspective view, FIG. 13B is a front view, FIG. 13C is a plan view and FIG. 13D is a side view of the jig 60. The jig 60 has a thin plate shape directing the inserting direction (detaching direction) to longitudinal direction. An attaching/detaching portion 61 which is detachably attachable to the stopper 52 is formed on the end portion in the inserting direction of the jig 60. As shown in FIG. 13C, the attaching/detaching portion 61 is comprised of a protrusion portion 61A and a connection portion 61B. The protrusion portion 61A is configured to be wider than the communication hole 52C2 of the jig attachment groove 52C and narrower than the locking hole 52C1 of the jig attachment groove 52C in a plan view. The connection portion 61B is configured to be narrower than the communication hole 52C2 of the jig attachment groove 52C. Namely, the connection portion 61B is configured to be narrower than the protrusion portion 61A. Consequently, a locking portion 61C having an L-shape in a plan view is formed at a boundary portion between the protrusion portion 61A and the connection portion 61B. The locking portion 61C is locked to a locking portion 52C1 of the jig attachment groove 52C of the stopper 52. When the jig 60 is pulled in the detaching direction in the above described state, the stopper 52 can be drawn out in the detaching direction.

An inclined surface where the width is gradually reduced toward the inserting direction in a plan view is formed on the end portion in the inserting direction of the protrusion portion 61A. When the jig 60 is inserted into the jig attachment groove 52C of the stopper 52 from the detaching direction toward the inserting direction, the inclined surface of the protrusion portion 61A gradually pushes and extends the inclined surface of the communication hole 52C2 and the end portion in the detaching direction of the stopper 52 can be temporarily elastically deformed. Consequently, the jig 60 can be attached to the stopper 52 from the detaching direction side.

FIGS. 14A and 14B are perspective views showing the structure of attaching and detaching the jig 60 to and from the stopper 52. FIG. 14A is a drawing showing a state that the stopper 52 is attached to the connector plug 10 while the slider 40 is separated from the connector plug 10. FIG. 14B is a drawing showing a state that the jig 60 is attached to the stopper 52 while the slider 40 is attached to the connector plug 10. As shown in the arrow mark of the inserting direction of FIG. 14B, when the jig 60 is inserted into the stopper 52 from the detaching direction toward the inserting direction, the inclined surface of the protrusion portion 61A gradually pushes and extends the inclined surface of the communication hole 52C2 and the end portion in the detaching direction of the stopper 52 is temporarily elastically deformed, as descried above. Consequently, the jig 60 can be attached to the stopper 52. As shown in the arrow mark of the detaching direction of FIG. 14B, when the jig 60 is pulled toward the detaching direction, the locking portion 61C of the jig 60 is locked to the locking portion 52C1 of the jig attachment groove 52C of the stopper 52 and the stopper 52 can be drawn out in the detaching direction together with the jig 60, as descried above. When the stopper 52 without having the gripping portion is used, the stopper 52 can be attached even if there is not an enough space at the rear side of the connector plug 10. In addition, the jig 60 can be used when detaching the stopper 52.

As explained above, when the connector plug of the present invention is used, the stopper can be attached and detached and the operation of the slider can be restricted only when the stopper is attached. Namely, the elastic deformation of the latches locked to the adapter can be restricted. More specifically, by using the stopper 50, the elastic deformation of the latches can be completely restricted and the fitting between the adapter and the connector plug can be prevented from being released. In addition, by using the stopper 51, the elastic deformation of the latches are not changed by the small force less than the predetermined value while the latches are elastically deformed by the large force having the predetermined value or more. Furthermore, by using the stopper 52, the stopper can be used even when there is not an enough space at the rear side of the connector plug. Furthermore, since the stopper 52 is not protruded from the rear end of the slider 40, the stopper 52 is prevented from being gripped from the outside of the slider 40.

In the above described embodiment, the stopper is formed in a plate shape having an approximately rectangular shape in a plan view. However, the shape of the stopper is not limited to the above described shape. Other shapes can be also adopted as long as the stopper is in contact with the plug body and the slider to restrict the elastic deformation of the latches. Note that it is not necessary that the stopper is in contact with the plug body and the slider immediately after the stopper is attached. It is also possible to have the structure that the stopper is in contact with the plug body and the slider when the slider is elastically deformed downward. In the above described embodiment, the stopper has a uniform thickness except for the portions where the raised portion, the notches and the like are formed. However, the stopper is not limited to the structure having a uniform thickness. For example, the stopper can have an inclined surface where the thickness is gradually reduced from the detaching direction toward the inserting direction.

In the above described embodiment, the notches provided on the stopper form a space having a rectangular cross-section in a front view. However, the shape of the notches is not limited to the above described shape. The notches 50D, 51D, 52D can have any shapes as long as the notches 50D, 51D, 52D can avoid the raised portion located at the center part in the width direction of the latch frame 22. The notches 50E, 51E, 52E can have any shapes as long as the notches 50E, 51E, 52E can avoid the contact with the latches 30. For example, the shape of the notches can be formed in a circular arc shape or a polygonal shape in a front view. Note that both the notch (e.g. notch 50D) without penetrating through in the thickness direction and the notch (e.g., notch 51D) penetrating through in the thickness direction are referred to as the notch in the present invention. In addition, each of the notches can partially or entirely penetrate through in the thickness direction. It is also possible that each of the notches does not partially or entirely penetrate through in the thickness direction. The force required for elastically deforming the laches toward the outer surface of the latch frame 22 can be optimized by arbitrarily changing the penetration state and the height of the notches.

In the above described embodiment, the attachment and detachment between the stopper and the jig are achieved by the locking of the locking portion having an L-shape. However, the attachment/detachment method between the stopper and the jig is not limited to the above described method. The other structures can be adopted as long as the stopper and the jig are configured to be detachably attachable to each other so that the stopper can be drawn out in the detaching direction. For example, the locking portion can be formed by a hook having a curved shape, a magnet or the like.

In the above described embodiment, the jig is formed in a thin plate shape. However, the shape of the jig is not limited to the above described shape. The other shapes can be adopted as long as the jig has a predetermined length. For example, the jig can be formed by a member having a circular column shape or a rectangular column shape and a linear member such as a wire.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

DESCRIPTION OF THE REFERENCE NUMERALS

1: optical fiber cable, 1A: optical fiber, 1B: ferrule, 1C: boot, 2: device, 3: panel, 4: adapter, 4A: locking piece, 10: connector plug, 20: plug body, 21: plug frame, 22: latch frame, 30: latch, 30A: locking portion, 40: slider, 41: cover portion, 41A: sliding groove, 42: gripping portion, 43: locking hole, 44: insertion hole, 50: stopper, 51: stopper, 52: stopper, 60: jig, 61: attaching/detaching portion

What is claimed is:

1. A connector plug to be fitted to an adapter, comprising:
a plug body that houses an optical fiber inside the plug body;
a latch that is supported on an outer surface of the plug body so as to be capable of being engaged with the adapter;
a slider that is supported on the plug body so as to be slidable with respect to the plug body; and
a stopper that is configured to be detachably attachable between the plug body and the slider, wherein
the slider is configured to be capable of elastically deforming the latch toward the outer surface of the plug body,
when the slider is slid in a detaching direction which is a direction of drawing the connector plug out of the adapter, the slider elastically deforms the latch toward the outer surface of the plug body,
when the stopper is attached between the plug body and the slider, the stopper restricts the slider from elastically deforming the latch toward the outer surface of the plug body, and the stopper is configured to be inserted between the plug body and the slider in an opposite direction of the detaching direction so that a distal end of the stopper is arranged between the latch and the slider.

2. The connector plug according to claim 1, wherein the latch extends toward the opposite direction of the detaching direction from the outer surface of the plug body.

3. The connector plug according to claim 2, wherein the stopper is configured to be inserted between the plug body and the slider in an opposite direction of the detaching direction so that a distal end of the stopper is arranged between the latch and the slider.

4. The connector plug according to claim 3, wherein the stopper has a notch for avoiding a contact with the latch, and
when the stopper is attached between the plug body and the slider, the stopper is in contact with the plug body and the slider without being in contact with the latch.

5. The connector plug according to claim 4, further comprising:
a jig that is configured to be detachably attachable to the stopper for drawing out the stopper in the detaching direction.

6. The connector plug according to claim 3, further comprising:
a jig that is configured to be detachably attachable to the stopper for drawing out the stopper in the detaching direction.

7. The connector plug according to claim 2, wherein the stopper has a notch for avoiding a contact with the latch, and
when the stopper is attached between the plug body and the slider, the stopper is in contact with the plug body and the slider without being in contact with the latch.

8. The connector plug according to claim 7, further comprising:
a jig that is configured to be detachably attachable to the stopper for drawing out the stopper in the detaching direction.

9. The connector plug according to claim 2, further comprising:
a jig that is configured to be detachably attachable to the stopper for drawing out the stopper in the detaching direction.

10. The connector plug according to claim 1, wherein the stopper has a notch for avoiding a contact with the latch, and
when the stopper is attached between the plug body and the slider, the stopper is in contact with the plug body and the slider without being in contact with the latch.

11. The connector plug according to claim 10, further comprising:
a jig that is configured to be detachably attachable to the stopper for drawing out the stopper in the detaching direction.

12. The connector plug according to claim 1, further comprising:
a jig that is configured to be detachably attachable to the stopper for drawing out the stopper in the detaching direction.

13. A stopper used for a connector plug, the connector plug comprising:
a plug body that houses an optical fiber inside the plug body;
a latch that is supported on an outer surface of the plug body so as to be capable of being engaged with an adapter;
a slider that is supported on the plug body so as to be slidable with respect to the plug body; and
a stopper that is configured to be detachably attachable between the plug body and the slider, wherein
the slider is configured to be capable of elastically deforming the latch toward the outer surface of the plug body,
when the slider is slid in a detaching direction which is a direction of drawing the connector plug out of the adapter, the slider elastically deforms the latch toward the outer surface of the plug body,
when the stopper is attached between the plug body and the slider, the stopper restricts the slider from elastically deforming the latch toward the outer surface of the plug body, and
the stopper is configured to be inserted between the plug body and the slider in an opposite direction of the detaching direction so that a distal end of the stopper is arranged between the latch and the slider.

* * * * *